US00RE39490E

(19) United States
(12) Reissued Patent
Cote et al.

(10) Patent Number: US RE39,490 E
(45) Date of Reissued Patent: Feb. 20, 2007

(54) SECURITY DEVICE HAVING MULTIPLE SECURITY FEATURES AND METHOD OF MAKING SAME

(75) Inventors: Paul F. Cote, Hollis, NH (US); Stephen B. Curdo, Hollis, NH (US); Gerald J. Gartner, Hollis, NH (US); Gary R. Wolpert, Mason, NH (US)

(73) Assignee: Technical Graphics, Inc., Milford, NH (US)

(21) Appl. No.: 10/612,731

(22) Filed: Jul. 1, 2003

Related U.S. Patent Documents

Reissue of:
(64) Patent No.: 6,255,948
Issued: Jul. 3, 2001
Appl. No.: 09/203,449
Filed: Dec. 1, 1998

U.S. Applications:
(60) Provisional application No. 60/067,228, filed on Dec. 2, 1997.

(51) Int. Cl.
*G08B 13/14* (2006.01)

(52) U.S. Cl. ..... 340/572.8; 340/572.6; 340/5.8; 340/572.1; 428/209; 428/381; 428/389; 428/399; 428/457; 428/916; 428/919; 235/449; 235/451; 235/452; 235/492; 235/493; 194/213; 283/82; 283/83

(58) Field of Classification Search ..... 340/5.8, 340/572.1, 572.6, 572.8; 194/213; 283/82, 283/83; 428/209, 381, 389, 399, 457, 916; 235/449, 451–453
See application file for complete search history.

(56) References Cited

U.S. PATENT DOCUMENTS 4,044,231 A * 8/1977 Beck et al. ..... 235/488
4,183,989 A * 1/1980 Tooth ..... 428/195

(Continued)

FOREIGN PATENT DOCUMENTS

EP 0330733 A1 * 11/1988
GB 2221425 A * 2/1990

OTHER PUBLICATIONS

Richard Tucker; "Portals and Tagsa make their mark in secure labels" article (date unknown).*

(Continued)

*Primary Examiner*—Benjamin C. Lee
(74) *Attorney, Agent, or Firm*—Holland & Bonzagni, P.C.; Mary R. Bonzagni, Esq.

(57) ABSTRACT

A security device having multiple security features is used with an item, such as a secure document, ticket, label or tag, to authenticate the item and/or encode data pertaining to the item. One example of the security device includes a carrier substrate, a metallic layer disposed on the carrier substrate, and a magnetic layer disposed on the metallic layer in substantial registration with at least a portion of the metallic layer, thereby providing both metallic security features and magnetic security features. The metallic layer and the magnetic layer also form graphic or visually identifiable indicia on the carrier substrate to provide a visual security feature. According to one method, the metallic layer is applied to the carrier substrate, the magnetic layer is applied to the metallic layer, and the layers are etched to form the graphic indicia. The magnetic layer can, in one embodiment, include a magnetic chemical resist that is printed on the metallic layer in the form of the graphic indicia. The magnetic security features use one or more magnetic characteristics, such as the level of magnetism and decay rate characteristic of soft magnetics, to authenticate and/or to encode data. The magnetic security feature may also include magnetic tracks for recording data. The metallic security features use different lengths of conductive regions to authenticate and/or encode data.

63 Claims, 4 Drawing Sheets

U.S. PATENT DOCUMENTS 4,446,204 A * 5/1984 Kaule et al. ..... 428/323
4,511,616 A * 4/1985 Pitts et al. ..... 428/203
4,584,529 A * 4/1986 Aoyama ..... 324/261
4,631,222 A * 12/1986 Sander ..... 428/172
4,631,223 A * 12/1986 Sander ..... 428/172
4,652,015 A * 3/1987 Crane ..... 283/91
4,869,778 A * 9/1989 Cote ..... 216/103
4,943,093 A * 7/1990 Melling et al. ..... 283/83
4,980,569 A * 12/1990 Crane et al. ..... 250/556
5,016,919 A * 5/1991 Rotondo ..... 283/82
5,042,842 A * 8/1991 Green et al. ..... 238/101
5,043,201 A * 8/1991 Cote ..... 428/195
5,093,184 A * 3/1992 Edwards ..... 428/195
5,112,672 A * 5/1992 Kaule et al. ..... 428/209
5,113,062 A * 5/1992 Fujita et al. ..... 235/493
5,190,318 A * 3/1993 Mantegazza ..... 283/82
5,196,681 A * 3/1993 Mantegazza ..... 235/449
5,265,916 A * 11/1993 Coe ..... 283/72
5,279,403 A * 1/1994 Harbaugh et al. ..... 194/207
5,284,363 A * 2/1994 Gartner et al. ..... 283/81
5,308,992 A * 5/1994 Crane et al. ..... 250/556
5,354,099 A * 10/1994 Kaule et al. ..... 283/85
5,388,862 A * 2/1995 Edwards ..... 283/82
5,394,969 A * 3/1995 Harbaugh ..... 194/206
5,417,316 A * 5/1995 Harbaugh ..... 194/206
5,419,424 A * 5/1995 Harbaugh ..... 194/206
5,457,382 A * 10/1995 Stein ..... 324/239
5,486,022 A * 1/1996 Crane ..... 283/83
5,516,153 A * 5/1996 Kaule ..... 283/85
5,535,871 A * 7/1996 Harbaugh ..... 194/206
5,543,911 A * 8/1996 Jeffers ..... 356/71
5,545,885 A * 8/1996 Jagielinski ..... 235/449
5,583,631 A * 12/1996 Lazzerini ..... 356/71
5,599,047 A * 2/1997 Kaule et al. ..... 283/85
5,601,931 A * 2/1997 Hoshino et al. ..... 235/493
5,614,824 A * 3/1997 Dames et al. ..... 324/239
5,697,649 A * 12/1997 Dames et al. ..... 283/83
5,786,587 A * 7/1998 Colgate, Jr. ..... 235/487
5,803,503 A * 9/1998 Kaule et al. ..... 283/85
5,949,050 A * 9/1999 Fosbenner et al. ..... 235/449

OTHER PUBLICATIONS

De La Rue Holographics; "The Mark of Authenticity" brochure; Pub. In Hampshire, England (date unknown).*

* cited by examiner

SECURITY DEVICE HAVING MULTIPLE SECURITY FEATURES AND METHOD OF MAKING SAME

Matter enclosed in heavy brackets [ ] appears in the original patent but forms no part of this reissue specification; matter printed in italics indicates the additions made by reissue.

RELATED APPLICATIONS

This application claims the benefit of U.S. Provisional Patent Application Ser. No. 60/067,228 filed Dec. 2, 1997, fully incorporated herein by reference.

FIELD OF THE INVENTION

The present invention relates to security devices and in particular, to a security device or element having multiple security features for use with valuable merchandise or items.

BACKGROUND OF THE INVENTION

Counterfeiting and tampering with secure documents or instruments, such as bank notes, checks, tickets, credit cards and the like, and other valuable merchandise or items is a common problem in many fields or enterprises. To prevent counterfeiting, many secure documents and other items of value include a security device or element, such as a security thread, disposed on or in the document. The security device typically includes one or more security features, such as metallic security features, magnetic security features, or luminescent security features, that authenticate the document and prevent counterfeiting and/or tampering.

To authenticate the document, many conventional security devices merely require that the existence of a single security feature be detected. Thus, counterfeiters need only recognize the security feature in a document or item and reproduce that one security feature in a counterfeit document or item such that the security feature is detectable to authenticate the counterfeit document. Advances in technology have brought even new and easier ways of identifying these security features and reproducing the valuable documents or instruments with the security device. Thus, a need exists for more covert security features that are not easily identified and reproduced.

One type of security thread includes metallic features, such as metallic graphic indicia, disposed on a carrier substrate. According to conventional chemical etching techniques, a chemical resist is printed on a metallic layer in the form of the graphical indicia, either positively or negatively, and de-metalization of the areas of the metallic layer not covered by the chemical resist causes the graphic indicia to be formed either negatively or positively by the remaining metallic layer. Security threads having only a metallic security feature, formed according to this method, do not provide adequate protection because the counterfeiter can easily recognize and reproduce the metallic graphic indicia.

Attempts have been made to combine multiple security features, such as metallic and magnetic features, to make counterfeiting more difficult. In one example, magnetic ink is used to print graphic indicia that can be read by MICR detectors. However, if magnetic ink is used to print graphic indicia on or with metallic security features, the magnetic features and metallic features are easily distinguishable and identified. A counterfeiter could recognize that both magnetic and metallic security features have been used and need to be reproduced.

Other types of security threads have also used hybrid metals or alloys to form graphic indicia having both magnetic and metallic security features. However, the hybrid metals and the process for depositing or applying the hybrid metals to form the graphic indicia is costly. Also, using hybrid metals limits the ability to vary the magnetic properties that can be used.

Accordingly, a need exists for a security device having multiple security features, such as metallic and magnetic security features, that are not easily distinguishable and recognizable upon observing the security device. A need also exists for a security device in which the security feature(s) is capable of providing machine readable encoded data, e.g., pertaining to the security device or document, in addition to detectable features for authentication of the security document. What is also needed is a method of making a magnetic/metallic security device using existing chemical etching or de-metalization techniques.

SUMMARY OF THE INVENTION

The present invention features a magnetic/metallic security device for use with an item to provide multiple security features. The security device includes a carrier substrate, a metallic layer disposed on the carrier substrate, for providing metallic security features, and a magnetic layer disposed on and in substantially identical registration with at least a portion of some of the metallic layer, for providing magnetic security features. The metallic layer and the magnetic layer together form graphic indicia on the carrier substrate, either positively or negatively. In one embodiment, a coating layer is disposed over the graphic indicia formed by the metallic layer and the magnetic layer.

The magnetic/metallic security device has different embodiments in which the magnetic layer provides magnetic security features. In one embodiment, the graphic indicia is formed as magnetic characters readable by MICR detectors. In another embodiment, the magnetic layer includes a hard magnetic substance capable of being magnetized for recording data on the magnetic layer.

In a further embodiment, the magnetic layer includes at least one type of magnetic substance having at least one predetermined magnetic characteristic that is detectable, for authenticating an item having said security device. In one example, the magnetic substance is a soft magnetic pigment capable of holding a level of magnetism for a limited period of time.

In a further embodiment, the magnetic layer includes at least first and second types of magnetic substances having at least first and second predetermined magnetic characteristics respectively. The first and second types of magnetic substances are arranged in the magnetic layer in a predetermined pattern representing data encoded with the magnetic layer such that the first and second predetermined characteristics are detectable to read the predetermined pattern and decode the data. In one example, the first and second predetermined magnetic characteristics represent binary integers, and the predetermined pattern of the first and second types of magnetic substances represents data in a binary coded format. One example of the first and second types of magnetic substances include first and second soft magnetic pigments having first and second predetermined magnetic decay rates and/or predetermined levels of magnetism.

The magnetic/metallic security device also has different embodiments in which the metallic layer provides metallic security features. In one embodiment, at least a portion of the metal layer includes at least one predetermined characteristic that is detectable, for authenticating an item having the security device.

In another embodiment, the metal layer forms a plurality of conductive regions on the substrate. The conductive regions are separated by non-conductive regions and have at least two different predetermined lengths forming a predetermined pattern for representing encoded data. The predetermined lengths of the conductive regions are detectable to read the predetermined pattern and decode the data. In one example, the conductive regions include first and second predetermined lengths representing binary integers, and the predetermined pattern of the first and second lengths of the conductive regions encodes the data in a binary coded format.

The present invention also features a magnetic security device for use with an item. The magnetic security device comprises a carrier substrate, and a plurality of magnetic regions disposed on the carrier substrate. The plurality of magnetic regions have different predetermined magnetic characteristics and are arranged in a predetermined pattern representing data encoded by the magnetic regions. The first and second predetermined characteristics are detectable to read the predetermined pattern and decode the data.

The present invention also features a metallic security device for use with an item. The metallic security device comprises a carrier substrate, and a plurality of conductive regions disposed on the carrier substrate. The conductive regions are separated by non-conductive regions and have at least two different predetermined lengths forming a predetermined pattern for representing encoded data. The predetermined lengths of the conductive regions are detectable to read the predetermined pattern and decode the data.

The present invention also features a method of making a magnetic/metallic security device having a plurality of security features. The method comprises: providing a carrier substrate having first and second surfaces; applying a metallic layer to at least a portion of the first surface of the carrier substrate; applying a magnetic layer over at least a portion of the metallic layer; and etching the magnetic layer and the metallic layer such that the magnetic layer and the metallic layer are in substantially identical registration and together form graphic indicia on the carrier substrate.

The preferred method of making a magnetic/metallic security device comprises: providing a carrier substrate having first and second surfaces; applying a metallic layer to at least a portion of the first surface of the carrier substrate; applying a magnetic chemical resist to at least a portion of the metallic layer, wherein the magnetic chemical resist forms a pattern of graphic indicia on the metallic layer; and chemically etching the metallic layer to remove exposed portions of the metallic layer, wherein chemical etching is resisted by the magnetic chemical resist such that the magnetic chemical resist and a portion of the metallic layer underlying the magnetic chemical resist together form the pattern of graphic indicia on the carrier substrate. The method can also include applying an additional layer over the graphical indicia formed by the magnetic chemical resist and the portion of the metallic layer underlying the magnetic chemical resist.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
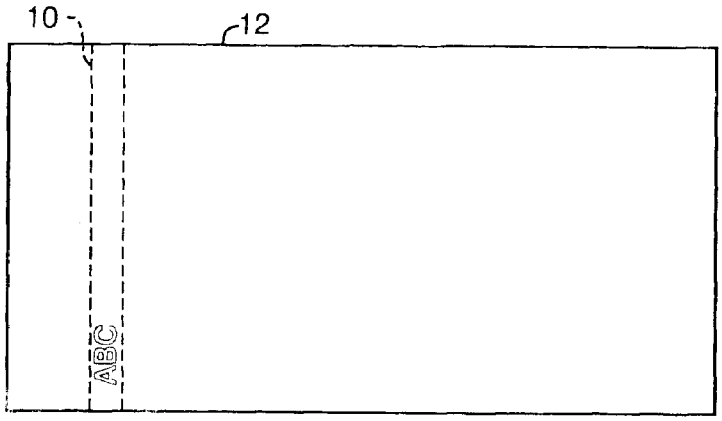
FIG. 1 is a top view of a document or item having a security device, according to the present invention.

A security device 10, FIG. 1, according to the present invention, is used with an item 12 to prevent counterfeiting or reproduction of the item 12 or another article to which the item 12 is attached. The security device 10 has multiple security features, such as metallic security features and magnetic security features, capable of being encoded with data in a machine readable format in addition to providing authentication of the item 12. The metallic and magnetic security features are preferably formed by using a magnetic chemical resist, as will be described in greater detail below, such that at least some of the metallic and magnetic security features are generally perfectly superimposed and substantially indistinguishable by the naked eye.

The security device 10 can be used in secure documents including, but not limited to, banknotes, currencies, passports, visas, titles, licenses, registrations, checks, money orders, original documents, certificates of authority, event tickets and gift certificates. The security device 10 provides authentication of the secure document and/or is encoded with data pertaining to the secure document or the security device itself.

The security device 10 can also be used in labels, tags or packaging material including, but not limited to, pressure sensitive labels, glue-on labels, in-mold labels, heat-shrink labels, woven labels, tear tapes, shrink-caps and collars, and stickers. In this example, the magnetic/metallic security device 10 authenticates and/or is encoded with data relating to the articles to which the labels or packaging material is attached, such as liquor or other commodities of value.

The security device 10 can further be used with a laminated article including, but not limited to, passports, ID Cards, access cards, licenses, and credit/debit cards. In this example, the security device 10 is used to authenticate the laminated article and/or is encoded with data relating to the article or the owner of the article.

The security device 10 can also be used in tickets or passes including, but not limited to, event tickets, transit tickets, lottery tickets, and admittance passes. According to this example, the security device 10 can provide authentication of the ticket or pass itself and/or can be encoded with data relevant to the event. The present invention also contemplates other uses and applications for the security device 10 to prevent counterfeiting, reproduction or otherwise provide security for items or articles of value.

According to the exemplary embodiment, the security device 10 is formed as a thread or strip that extends partially or entirely along the item 12 in any direction. The security device 10 can be embedded within the item 12, adhered to the item 12, woven in the item 12, or laminated between multiple layers of the item 12. The item 12 can also include multiple security devices 10 according to the present invention.

Figure 2:
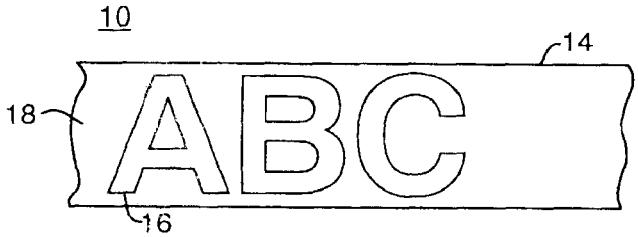
FIG. 2 is an enlarged top view of a magnetic/metallic security device, according to one embodiment of the present invention.

The security device 10, FIG. 2, includes a carrier substrate 14, for example, formed as a thread or strip. One type of carrier substrate 14 is made of a polyester, polyvinyl carbonate or polypropylene film on paper. Alternatively, the carrier substrate 14 can be a plastic film or metallized paper, or other type of material used in conventional security threads.

In the exemplary embodiment, the security device 10 includes graphic indicia 16 formed from a metallic/magnetic medium disposed on the carrier substrate 14. The graphic indicia 16 can be formed positively on the carrier substrate 14, i.e. the graphic indicia 16 is composed of the magnetic/metal medium. The graphic indicia 16 can also be formed in the reverse, i.e. the area 18 surrounding the graphic indicia 16 is composed of the magnetic/metallic medium. The magnetic/metallic security device 10 can also be formed with a combination of positive and reverse graphic indicia 16. The graphic indicia 16 can be printed as line work in which solid areas are printed in the desired shape or as halftone in which tiny dots are printed with varying spacing to vary the shading. Although the graphic indicia 16 are shown as alphanumeric characters, the present invention contemplates any type of symbol, design, shape or other graphic indicia.

Figure 3A:
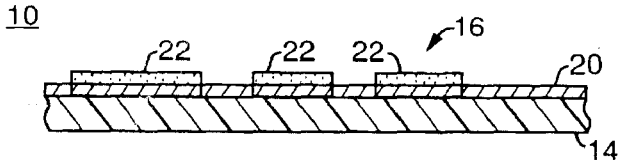
FIGS. 3A–3C are side, cross-sectional views of a method of making the magnetic/metallic security device, according to the present invention.
Figure 3B:
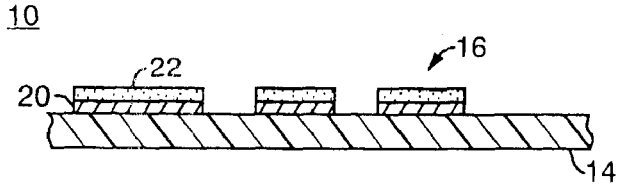

The method of making the exemplary security device 10, FIGS. 3A and 3B, according to the present invention, includes first applying a metallic layer 20 to the carrier substrate 14. The metallic layer 20 preferably includes aluminum that has been sputtered or vapor deposited on the carrier substrate 14. Alternatively, the metallic layer 20 can be a metallic foil or other type of metal applied to the carrier substrate 14.

Next, a magnetic chemical resist 22 is applied to the metallic layer 20 according to the desired pattern of graphic indicia 16, e.g. printed in positive, reverse or both. The magnetic chemical resist 22 includes film-forming chemical resisting resins containing ferromagnetic and or other magnetic pigments. Examples of the chemical resist include, but are not limited to, solvent based, water based or solid based, ultra violet (UV) or electron beam (EB) polymerized resin systems or other conventional chemical resist resins. The magnetic pigments include both hard and soft magnetic pigments, as will be described in greater detail below, typically ranging from about 200 oersteds to 10,000 oersteds.

An etching process is then performed on the magnetic/metallic security device 10, FIG. 3B, that removes portions of the metallic layer 20 that are not protected by the magnetic chemical resist 22. The etching process includes conventional chemical etching processes known to those of ordinary skill in the art. The magnetic chemical resist 22 resists the chemical attack and remains on the underlying metallic layer 20, arranged in the desired printed pattern. The magnetic chemical resist 22 is superimposed in substantially identical registration with at least a portion of the underlying metal layer 20, thereby providing both magnetic and metallic security features that are substantially indistinguishable in at least some areas of the security device 10. The magnetic chemical resist 22 thus acts both to resist chemical attack while etching the metallic layer 20 and to provide a magnetic security feature superimposed on the metallic security feature so as to be not easily identified.

Alternatively, the graphical indicia 16 can be formed using other types of techniques including, but not limited to, lasers, mechanical scribing, abrading, and the like. In one example, a substrate containing a metallic layer is overcoated with a magnetic layer and subjected to a laser etching process. The laser etching selectively removes both the magnetic and metallic layers and forms the desired graphical indicia 16 having the magnetic security feature superimposed substantially identically over the metallic security feature.

Figure 3C:
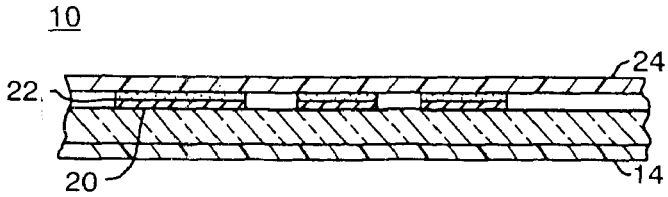

The present invention also contemplates using an additional coating or laminate 24, FIG. 3C, over the graphic indicia 16, on one or both sides. In one example, the additional layer 24 is used to help hide the security device 10 when embedded in paper and viewed with reflected light. In this case, however, the graphic indicia 16 created with the magnetic chemical resist will remain observable when viewed in transmitted light.

Figure 4A:
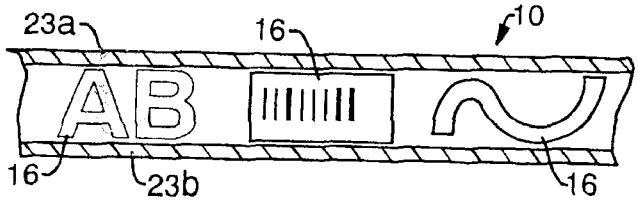
FIG. 4A is a top view of a magnetic/metallic security device having magnetic tracks, according to one embodiment of the present invention.
Figure 4B:
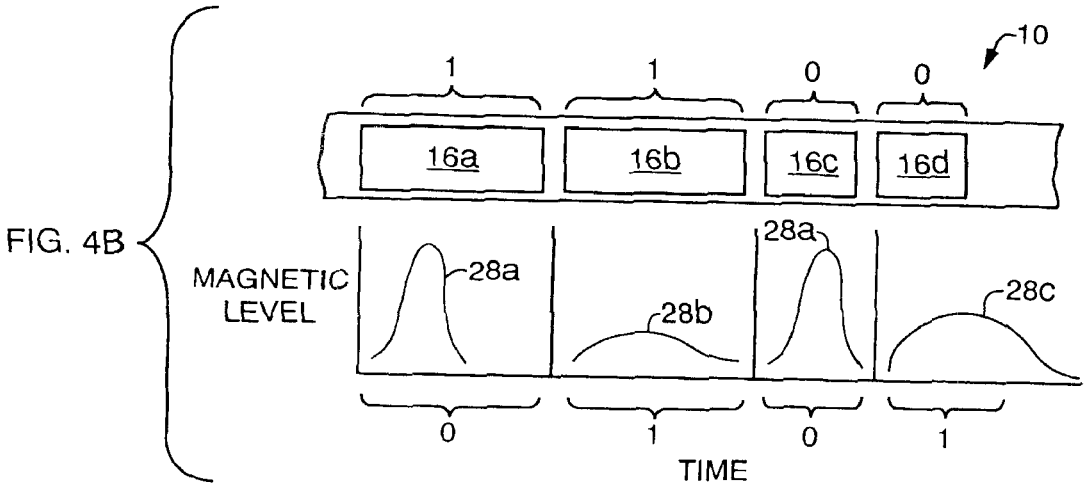
FIG. 4B is a schematic and graphical illustration of the magnetic/metallic security device having machine readable encoded magnetic and metallic security features, according to one embodiment of the present application.

The security device 10, FIGS. 4A and 4B, can be encoded with machine readable analog or digital data as well as provide authentication in multiple ways by using the various properties of the metallic and magnetic security features. Using one or more metallic and/or magnetic properties to authenticate the security device 10 or item 12 involves detecting whether or not the one or more properties are present on the security device 10. Using the one or more metallic and/or magnetic properties to encode as analog or digital data involves detecting and reading a combination of properties that represents a numerical code, e.g. in Binary-Coded Decimal (BCD) format, and decoding the code to determine the data represented thereby.

The magnetic security feature is capable of authenticating an item or encoding data pertaining to the item in multiple ways. In one example, the graphic indicia 16 are formed as magnetic characters that can be read by conventional MICR detectors. In this example, the graphic indicia 16 are preferably formed as positive text.

According to another example, the magnetic chemical resist 22 includes a hard magnetic pigment that is capable of being magnetized in the same manner as a magnetic recording tape. In this example, graphic indicia 16, FIG. 4A, is preferably formed as reverse text such that the magnetic chemical resist 22 including the hard magnetic pigment forms one or more magnetic tracks 23a, 23b. Authenticating data or other information can be written to and read from the magnetic track(s) 23a, 23b using conventional recording devices and read using conventional readers.

According to a further example, the magnetic chemical resist 22 includes a soft magnetic that can be magnetized and holds a level of magnetism for a limited period of time depending upon the characteristics or properties of the soft magnetic. Using the soft magnetic allows the magnetic security feature to be further concealed because the magnetic properties will not be detected unless the soft magnetic is first magnetized. Soft magnetics typically have predetermined magnetic characteristics, such as a level of magnetism that they can achieve and rate of decay of magnetic charge. Soft magnetics can be used to provide authentication, by first magnetizing the magnetic/metallic security device 10 and then detecting the existence of the magnetic, the level of magnetism, or the rate of decay.

By providing soft magnetics with varying magnetic characteristics, such as different levels of magnetism which can be attained or rates of decay, the graphic indicia 16, FIG. 4B, can further be used to encode data in a machine readable format. For example, the graphic indicia segments 16a–16d can include two types of soft magnetic pigments, one having a fast decay rate 28a and one having a slow decay rate 28b, 28c that represent binary integers encoding data in BCD format. Some segments 16a, 16c of the graphic indicia are printed with magnetics having a fast decay rate and other segments 16b, 16d of the graphic indicia are printed with magnetics having a slow decay rate. Data is thereby encoded in BCD format (0101) by providing a predetermined pattern of segments 16a–16d having the two different types of magnetic pigments. The encoded data can include verification data or other data pertaining to the item 12.

According to one method of the present invention, different formulations of the magnetic chemical resist 22 having magnetic pigments with different magnetic properties or characteristics are printed onto the metallic layer 20 using multiple print stations, such as an offset printing press similar to the type used for multicolor printing. Using multiple print stations allows graphic indicia to be printed in any desired pattern using various combinations of magnetic chemical resists having various different magnetic properties.

The present invention also contemplates simultaneously using the level of magnetism and decay rate properties of the soft magnetics, as well as a mixture of hard and soft magnetics to achieve any desired combination of magnetic characteristics or properties for authenticating an item or encoding data pertaining to an item. Although the exemplary embodiment described above refers to two different magnetic properties for encoding data in BCD format, any number of different properties can be used to encode data in other numerical formats. For example, FIG. 4B shows three magnetic levels—a high magnetic level 28a, a low magnetic level 28b, and a medium magnetic level 28c. In addition to providing authentication and encoding data using the magnetic security features, the metallic security feature can also provide authentication and/or encode data, e.g., by forming the segments 16a–16d with different lengths of metal representing data in BCD format (1100), as will be described in greater detail below.

Figure 5:
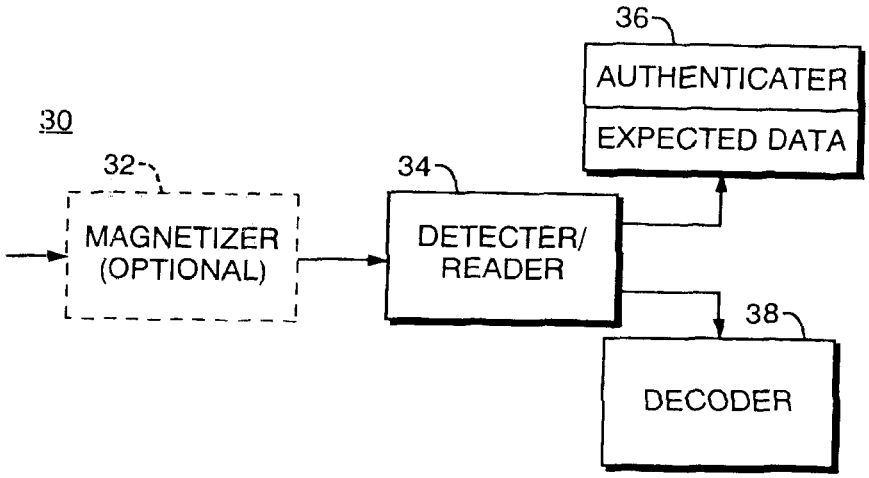
FIG. 5 is a functional block diagram of a device for detecting or reading the magnetic security features, according to one embodiment of the present invention.

The device 30, FIG. 5, used to read the magnetic/metallic security features includes at least a detector/reader 34 for detecting one or more characteristics of the metal and/or magnetic layers and/or for reading the predetermined pattern formed by the metal and magnetic regions having different characteristics. After detecting the one or more characteristics, an authenticator 36 determines whether the security device is authentic. After reading the predetermined pattern, a decoder 38 decodes the data represented by the predetermined pattern.

When the security device 10 includes magnetic security features having soft magnetics, the device 30 further includes a magnetic charger 32 that charges the soft magnetic pigments prior to the reader 34 detecting the features of the magnetics, such as the existence of magnetics, the level of magnetization, the decay rate of the magnetic, or other detectable magnetic characteristics. Authentication can be made based upon whether the soft magnetic is present, whether the soft magnetic has a predetermined level of magnetization, or whether the soft magnetic has a predetermined decay rate.

Decoding is performed by determining the pattern of the different magnetic characteristics read by the reader 34. For example, if the magnetic/metallic security device 10 shown in FIG. 4 is magnetized with the magnetizer 32, after a period of time, the segments 16b, 16d having a slower decay rate 28b, 28c will remain magnetized while the segments 16a, 16c having a faster decay rate 28a will no longer be magnetized. The reader 34 distinguishes the different magnetic properties and determines the predetermined pattern of magnetic properties. From the predetermined pattern of magnetic properties, the corresponding binary representation (0101) and the data represented thereby is decoded.

Figure 6:
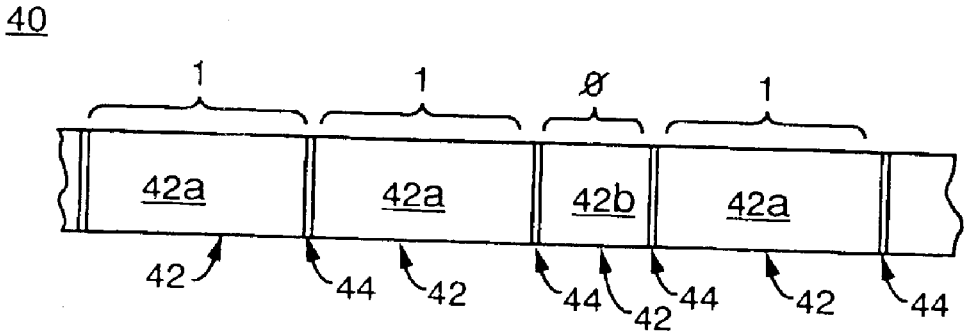
FIG. 6 is a schematic illustration of a machine readable encoded metallic security feature, according to one embodiment the present invention.

The metallic security feature 40, FIG. 6, according to one embodiment of the present invention, includes a plurality of conductive regions 42 and non-conductive regions 44, such as a metallized polyester film having demetalized breaks, for example, formed using the chemical resist process described above. Each non-conductive region 44 is disposed between two of the conductive regions 42. The plurality of conductive regions 42 and nonconductive regions 44 form a predetermined pattern that represents a verification code or data encoded with the metallic security feature 40.

Each conductive region 42 has one of at least two predetermined lengths, for example, long conductive regions 42a and short conductive regions 42b. Each predetermined length corresponds to a predetermined value so that the data can be determined by detecting the length of each conductive region 42 and determining a corresponding value.

In one example, long conductive regions 42a correspond to a "1" and the short conductive regions 42b corresponds to a "0". According to this example, the long and short conductive regions 42a, 42b are used to encode data in BCD format. The long and short conductive regions 42a, 42b are arranged in a predetermined series corresponding to the binary representation of the data to be encoded. In this example, the detector/reader 34 detects the length of each conductive region 42 in the series (e.g. long or short) and determines the corresponding binary representation. To provide authentication, the binary representation will be matched to a predefined verification code for an item 12. To read encoded data, the binary representation will be further decoded.

Accordingly, depending upon the arrangement of the conductive regions 42 having varying lengths, a virtually unlimited number of verification codes or data can be encoded using the machine readable metallic security features 40. The machine readable metallic security feature 40 according to the present invention allows encoded data to be easily varied by varying the sequence of the conductive regions 42a, 42b. The conductive regions can be formed according to various designs provided that they are conductive over one of the predetermined lengths, as will be described in greater detail below. Although only two lengths are discussed herein for simplification, the present invention contemplates using conductive regions of any number of different lengths for encoding data. For example, octal data can be encoded using eight (8) different length conduction regions.

Figure 7:
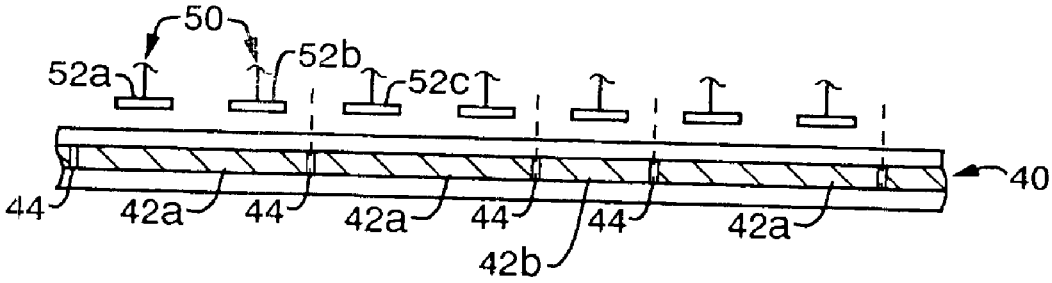
FIG. 7 is a side cross-sectional view of the machine readable encoded metallic security feature and capacitive sensors, for reading the encoded data, according to one embodiment of the present invention.

One method of reading and verifying the machine readable metallic security feature 40, FIG. 7, is by detecting the long and short conductive regions 42a, 42b using capacitive verification or detection, such as disclosed in U.S. Pat. No. 5,419,424 issued to Harbaugh and incorporated herein by reference. According to capacitive verification methods, the machine readable metallic security feature 40 is positioned proximate capacitive sensors 50 coupled to a verification device (not shown). When capacitive sensors 50 are positioned proximate conductive regions 42, the conductive regions 42 capacitively couple one sensor 52a to another sensor 52b. Where there is a non-conductive region 44 or "break" in the conductivity, there will be no capacitive coupling between the adjacent capacitive sensors 52b, 52c on either side of the non-conductive region 44. By detecting the changes in capacitance when the machine readable encoded metallic security feature 40 is positioned proximate the capacitive sensors 50, the presence of the long and short conductive regions 42a, 42b are effectively detected. The present invention also contemplates other verification devices and methods capable of detecting the lengths of the conductive regions 42a, 42b, such as various electromagnetic verification devices.

The conductive regions 42 of the machine readable encoded metallic security feature 40 are preferably formed from a metallic material, such as aluminum. Exemplary methods include, but are not limited to, forming the conductive regions 42 by metalization of a polyester film, hot stamped foil, and printing the conductive regions 42 with a metallic ink. The present invention contemplates other types of metallic material and methods of forming the metallic conductive regions and non-conductive breaks.

The machine readable encoded metallic security feature 40 and the security device 10 in which it is used are preferably designed to allow minimal "stretching," for example, approximately 5% or less variation in length. Also, the detection of the lengths of the conductive regions 42a, 42b should account for the potential stretching of the security device and machine readable encoded metallic security feature 40, for example, by accounting for the potential percentage of change in length.

Figure 8:
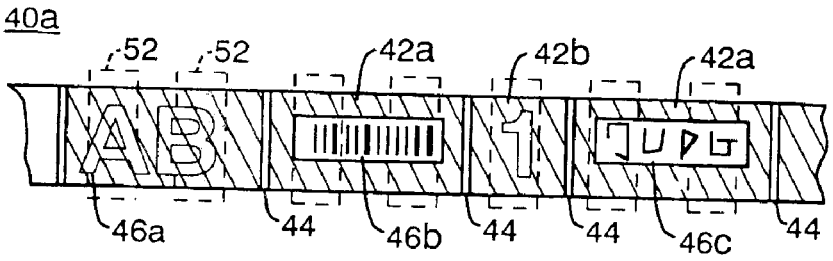
FIG. 8 is an enlarged top view of a machine readable metallic security feature, according to another embodiment of the present invention.

According to another embodiment of the machine readable encoded metallic security feature 40a, FIG. 8, of the present invention, each conductive region 42a, 42b includes indicia 46 disposed thereon. Indicia 46 printed or disposed on the conductive regions 42a, 42b can be used for providing an additional verification code or data or can be used to provide false patterns that deceive the counterfeiter and hide the true verification code. Such indicia includes alphanumeric characters 46a, bar codes 46b, or other designs 46c. The indicia 46a–46c according to this embodiment is printed or disposed on the conductive regions 42a, 42b without breaking the conductivity of each conductive region 42a, 42b and without affecting the capacitive detection of the length of each conductive region 42a, 42b using capacitive sensors 52.

Figure 9:
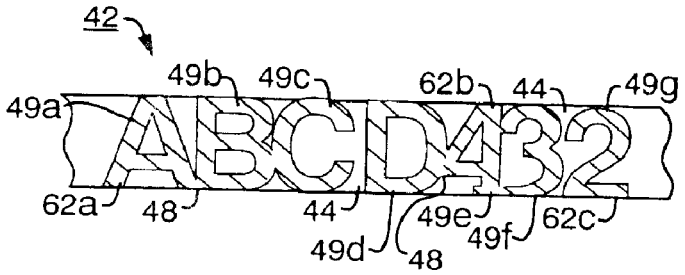
FIG. 9 is an enlarged top view of a machine readable metallic security feature, according to a further embodiment of the present invention.

According to another embodiment of the machine readable encoded metallic security feature 40b, FIG. 9, the conductive regions 42 are formed as conductive indicia regions 62a–62c formed from a conductive material, for example, printed with metallic ink or formed with a chemical resist process. The conductive indicia regions 62a, 62c are established by having the individual characters or symbols 49a–49f of the indicia connected at contact points 48 and separated at the non-conductive regions 44. The conductive indicia regions 62a–62c thus have predetermined lengths and are arranged in predetermined patterns representing the encoded data to be detected, as discussed above. The conductive indicia regions 62a–62c include alphanumeric characters as well as other symbols or characters used for providing an additional verification code or to provide false patterns that deceive the counterfeiter and hide the true encoded data.

Figure 10:
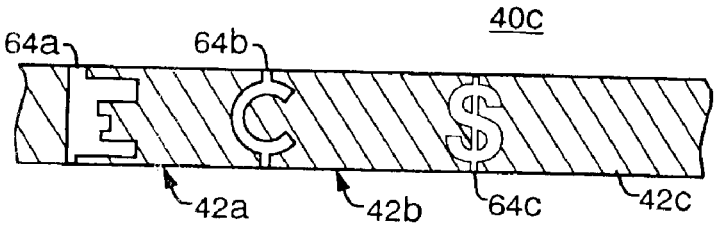
FIG. 10 is an enlarged view of a machine readable metallic security feature, according to yet another embodiment of the present invention.

A further embodiment of the machine readable encoded metallic security feature 40c, FIG. 10, of the present invention includes conductive regions 42a–42c, such as narrow regions of metallic material, and non-conductive indicia regions 64a–64c breaking the conductivity between the conductive regions 42a–42c. For example, specific alphanumeric characters or other symbols can be formed of non-conductive material or by a chemical resist or demetalizing process between the conductive regions 42a–42c to provide the "break" in conductivity. The alpha-numeric characters or other symbols constituting the non-conductive indicia regions 64a–64c further provide additional data or codes and false patterns that deceive the counterfeiter and hide the true encoded data.

The present invention contemplates using the magnetic security features and metallic security features alone or together on a security device. Any number of the magnetic or metallic properties described above can be used individually or combined with other properties to provide authentication of an item, encode data pertaining to an item, or both.

Figure 11:
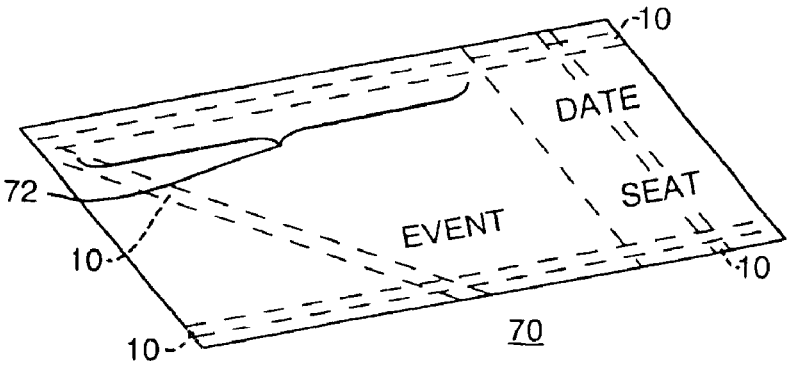
FIG. 11 is a schematic representation of a security instrument, according to one embodiment of the present invention.

According to the various embodiments of the present invention, one or more security devices or threads 10, FIG. 11, can be provided in various locations on or embedded in a secure document or instrument 70. The one or more security devices 10 are also readable in various directions as well as right side up or upside down. In one example, the secure instrument 70 is formed by gluing the security device 10 between two half-weight layers of paper which are then laminated together. In this example, the security device 10 is preferably unlaminated so that any attempt to delaminate the instrument 70 and remove the security device 10 will cause the paper laminating adhesive to remove the metallic and/or magnetic security features and alter the security feature or encoded data.

One example of the instrument 70 is a ticket used for sporting events, concerts, theater, shows, lotteries, transportation, theme parks, fairs, and other events. The security device 10 in the ticket can be encoded with a predetermined authentication code or encoded data that can be read when the security instrument 70 is presented, e.g. upon admission to a particular event. In one example, one full code 72 appears in approximately 2.5 in.

Accordingly, the security device of the present invention authenticates an item and/or is encoded with data pertaining to the item in numerous ways with one or more security features, such as metallic security features and magnetic security features that generally appear together as one single security feature. The security features and encoded data are thus more difficult to identify and reproduce. The method of making the security device using chemical etching and a magnetic chemical resist results in a magnetic security feature that is substantially indistinguishable from a metallic security feature. The method of printing graphic indicia using a magnetic chemical resist also facilitates the use of magnetic pigments having different magnetic characteristics or properties by printing different formulations of the magnetic chemical resist.

Modifications and substitutions by one of ordinary skill in the art are considered to be within the scope of the present invention which is not to be limited except by the claims which follow.

What is claimed is:

1. A magnetic/metallic security device for use with an item to provide multiple security features, said magnetic/metallic security device comprising:

a carrier substrate having a width;

a metallic layer disposed on at least a portion of said carrier substrate, for providing metallic security features, wherein said metallic layer forms a plurality of conductive regions on said carrier substrate, wherein said conductive regions are separated by non-conductive regions which extend entirely across said width of said carrier substrate; and a magnetic layer disposed on and in substantially identical registration with at least one of said plurality of said conductive regions, for providing magnetic security features, wherein said magnetic layer and said at least one conductive regions in substantially identical registration include recesses, said recesses forming visually identifiable indicia.

2. The magnetic/metallic security device of claim 1, wherein said magnetic layer includes a chemical resist.

3. The magnetic/metallic security device of claim 1, wherein said magnetic layer includes a hard magnetic substance capable of being magnetized for recording data on said magnetic layer.

4. The magnetic/metallic security device of claim 1, wherein said magnetic layer includes at least one type of magnetic substance having at least one predetermined magnetic characteristic, and wherein said at least one predetermined magnetic characteristic is detectable, for authenticating an item having said security device.

5. The magnetic/metallic security device of claim 4, wherein said at least one type of magnetic substance is a soft magnetic pigment capable of holding a level of magnetism for a limited period of time, and wherein said at least one predetermined magnetic characteristic includes said level of magnetism capable of being held by said soft magnetic pigment and a rate of decay of said level of magnetism over said limited period of time.

6. The magnetic/metallic security device of claim 1, wherein said magnetic layer includes at least first and second types of magnetic substances having at least first and second predetermined magnetic characteristics respectively, and wherein said first and second types of magnetic substances are arranged in said magnetic layer in a predetermined pattern representing data encoded with said magnetic layer such that said first and second predetermined characteristics are detectable to read said predetermined pattern and decode said data.

7. The magnetic/metallic security device of claim 6, wherein said first and second predetermined magnetic characteristics represent binary integers, and wherein said predetermined pattern of said first and second types of magnetic substances represents data in a binary coded format.

8. The magnetic/metallic security device of claim 6, wherein said first and second types of magnetic substances having said first and second predetermined magnetic characteristics include first and second soft magnetic pigments having first and second predetermined magnetic decay rates.

9. The magnetic/metallic security device of claim 6, wherein said first and second types of magnetic substances having said first and second predetermined magnetic characteristics include first and second soft magnetic pigments capable of holding first and second predetermined levels of magnetism.

10. The magnetic/metallic security device of claim 1, wherein at least a portion of said metal layer includes at least one predetermined magnetic characteristic, and wherein said at least one predetermined magnetic characteristic is detectable, for authenticating an item having said security device.

11. The magnetic/metallic security device of claim 1 wherein at least first and second conductive regions of said plurality of conductive regions separated by non-conductive regions have at least two different predetermined lengths forming at least first and second metallic characteristics respectively, forming a predetermined pattern representing data encoded by said metallic layer, and wherein said predetermined pattern may be detected and read to decode said data.

12. The magnetic/metallic security device of claim 11, wherein said conductive regions include first and second predetermined lengths representing binary integers, and wherein said predetermined pattern of said first and second lengths of said conductive regions encodes said data in a binary coded format.

13. The magnetic/metallic security device of claim 11, wherein said data encoded by said predetermined pattern of said conductive regions is a verification code.

14. The magnetic/metallic security device of claim 1, wherein said visually identifiable graphic indicia is formed positively on said carrier substrate by said magnetic layer and said metallic layer underlying said magnetic layer.

15. The magnetic/metallic security device of claim 1, wherein said visually identifiable indicia is formed negatively on said carrier substrate by said magnetic layer and said metallic layer underlying said magnetic layer.

16. The magnetic/metallic security device of claim 1, further including a coating layer disposed over said visually identifiable indicia formed by said metallic layer and said magnetic layer.

17. The magnetic/metallic security device of claim 16, wherein said visually identifiable indicia is hidden when viewed by reflected light and is observable when viewed by transmitted light.

18. The magnetic/metallic security device of claim 1, further including at least one magnetic track disposed along at least a portion of said substrate, for recording data.

19. A magnetic security device for use with an item, said magnetic security device comprising:

a carrier substrate having a width;

a metallic layer disposed on at least a portion of said carrier substrate, for providing metallic security features, wherein said metallic layer forms a plurality of conductive regions on said carrier substrate, wherein said conductive regions are separated by non-conductive regions which extend entirely across said width of said carrier substrate; and a magnetic layer disposed on and in substantially identical registration with at least one of said plurality of conductive regions, for providing magnetic security features, wherein said magnetic layer and said at least one conductive regions is substantially identical registration include recesses, said recesses forming visually identifiable indicia, wherein said plurality of magnetic regions include at least first and second types of soft magnetic pigments having first and second predetermined magnetic decay rates, wherein said plurality of magnetic regions having said first and second predetermined magnetic decay rates are arranged in a predetermined pattern representing data encoded by said magnetic regions such that said first and second predetermined magnetic decay rates are capable of being detected and read to decode said data.

20. The magnetic security device of claim 19, wherein said first and second predetermined magnetic decay rates represent binary integers, and wherein said predetermined pattern of said magnetic regions having said first and second predetermined magnetic decay rates represents data in a binary coded format.

21. The magnetic security device of claim 19, wherein said first and second types of soft magnetic pigments are capable of holding first and second predetermined levels of magnetism, wherein said magnetic regions having said first and second levels of magnetism are arranged in said predetermined pattern such that said first and second levels of magnetism may be detected and read to decode said data encoded by said magnetic regions.

22. The magnetic security device of claim 19, wherein said magnetic regions are formed as graphic indicia on said carrier substrate.

23. A metallic security device for use with an item, said metallic security device comprising:

a carrier substrate *having a width*; and a plurality of conductive regions disposed on said carrier substrate, wherein said conductive regions are separated by non-conductive regions *which extend entirely across said width of said carrier substrate* and have at least two different predetermined lengths forming a predetermined pattern for representing encoded data, and wherein said predetermined lengths of said conductive regions are detectable to read said predetermined pattern and decode said data,

*wherein said non-conductive regions are formed as graphic indicia and said conductive regions are formed around said graphic indicia*.

[24. The metallic security device of claim 23, wherein said conductive regions include first and second predetermined lengths representing binary integers, and wherein said predetermined pattern of said first and second lengths of said conductive regions encodes said data in a binary coded format.]

[25. The metallic security device of claim 23, wherein said non-conductive regions are formed as graphic indicia and said conductive regions are formed around said graphic indicia.]

26. A method of making a magnetic/metallic security device having a plurality of security features, said method comprising:

providing a carrier substrate having first and second surfaces;

applying a metallic layer to at least a portion of said first surface of said carrier substrate;

applying a metallic layer over at least a portion of said metallic layer; and etching said magnetic layer and said metallic layer such that at least a portion of said magnetic layer and said metallic layer are in substantially identical registration and together form visually identifiable indicia on said carrier substrate, wherein said metallic layer is etched such that said metallic layer forms a plurality of conductive regions on said substrate, wherein said conductive regions are separated by non-conductive regions extending across an entire width of said carrier substrate.

27. The method of claim 26, wherein etching said magnetic layer and said metallic layer includes chemically etching said magnetic layer and said metallic layer.

28. The method of claim 26, wherein etching said magnetic layer and said metallic layer includes laser etching said magnetic layer and said metallic layer.

29. The method of claim 26, wherein etching said magnetic layer and said metallic layer includes mechanically scribing said magnetic layer and said metallic layer.

30. The method of claim 26, wherein said magnetic layer includes at least first and second types of magnetic substances having at least first and second predetermined magnetic characteristics respectively, and wherein said magnetic layer is applied such that said first and second types of magnetic substances are arranged in said magnetic layer in a predetermined pattern.

31. A method of making a magnetic/metallic security device having a plurality of security features, said method comprising:

providing a carrier substrate having first and second surfaces;

applying a metallic layer to at least a portion of said first surface of said carrier substrate;

applying a magnetic chemical resist to at least a portion of said metallic layer, wherein said magnetic chemical resist forms a pattern on said metallic layer; and chemically etching said metallic layer to remove exposed portions of said metallic layer, wherein chemical etching is resisted by said magnetic chemical resist such that said magnetic chemical resist and at least a portion of said metallic layer underlying said magnetic chemical resist are in substantially identical registration and together form visually identifiable indicia on said carrier substrate, wherein said metallic layer is chemically etched such that said metallic layer forms a plurality of conductive regions on said substrate, wherein said conductive regions are separated by non-conductive regions extending across an entire width of said carrier substrate.

32. The method of claim 31, wherein said magnetic chemical resist includes a film-forming chemical resisting resin containing magnetic pigments.

33. The method of claim 32, wherein said film-forming chemical resisting resin includes a resin selected from the group consisting of solvent based resins, water based resins, solid based resins, ultra violet polymerized resins, and electron beam polymerized resins.

34. The method of claim 32, wherein said magnetic pigments include soft magnetic pigments having at least one predetermined magnetic characteristic.

35. The method of claim 31 wherein the step of applying said magnetic chemical resist includes printing said pattern using said magnetic chemical resist.

36. The method of claim 31 further including:

applying an additional layer over said pattern formed by said magnetic chemical resist and said portion of said metallic layer underlying said magnetic chemical resist.

37. A method of authenticating a magnetic/metallic security device, *the device having a width and* including at least one magnetic region having at least one predetermined magnetic characteristic, [and at least one] *a plurality of* metallic, [region] *conductive regions each* having [at least one] *a* predetermined metallic characteristic *and non-conductive regions, wherein said non-conductive regions extend entirely across said width of said security device*, said method comprising the steps of:

[charging] *magnetizing* said magnetic region of said magnetic/metallic security device;

detecting said predetermined magnetic characteristic of said [charged] *magnetized* magnetic region;

detecting said [at least one] predetermined metallic [characteristic] *characteristics* of said [at least one] metallic [region] *regions*; and comparing said at least one predetermined magnetic characteristic and said [at least one] predetermined metallic [characteristic] *characteristics* to expected magnetic and metallic characteristics.

38. The method of claim 37 wherein said magnetic characteristic includes a magnetic level.

39. The method of claim 38 wherein said magnetic level is selected from the group consisting of a high magnetic level, a low magnetic level and a medium magnetic level.

40. The method of claim 37 wherein said magnetic characteristic includes the rate of decay of said charged magnetic region.

41. The method of claim 37 further including before the step of charging said magnetic region the step of determining the presence of said magnetic region on said magnetic/metallic security device.

42. The method of claim 37 further including before the step of charging said magnetic region the step of determining the presence of said metallic region on said magnetic/metallic security device.

43. The method of claim 37 wherein said at least one magnetic region includes hard magnetics for recording data thereon, and further including the step of reading said data recorded on said at least one magnetic region.

44. The method of claim 43 wherein said data recorded on said magnetic region includes analog data.

45. The method of claim 43 wherein said data recorded on said magnetic region includes digital data.

46. The method of claim 37 wherein said metallic characteristic includes a length of said metallic region.

47. A magnetic/metallic security device for use with an item to provide multiple security features, said magnetic/metallic security device comprising:

a carrier substrate *having a width*;

a metallic layer disposed on at least a portion of said carrier substrate, for providing metallic security features, *wherein said metallic layer forms a plurality of conductive regions on said carrier substrate, and wherein said conductive regions are separated by non-conductive regions which extend entirely across said width of said carrier substrate*; and a magnetic layer disposed on and in substantially identical registration with said metallic layer, for providing magnetic security features, wherein said magnetic layer and said metallic layer together form visually identifiable graphic indicia on said at least a portion of said carrier substrate.

48. The magnetic/metallic security device of claim 47, wherein said visually identifiable graphic indicia is formed as magnetic/metal graphic indicia readable by MICR detectors.

49. A magnetic/metallic security device for use with an item to provide multiple security features, said magnetic/metallic security device comprising:

a carrier substrate *having a width*;

a metallic layer disposed on at least a portion of said carrier substrate, for providing metallic security features, *wherein said metallic layer forms a plurality of conductive regions on said carrier substrate, and wherein said conductive regions are separated by non-conductive regions which extend entirely across said width of said carrier substrate*; and a magnetic layer disposed on and in substantially identical registration with said metallic layer, for providing magnetic security features, wherein said magnetic layer and said metallic layer together form visually identifiable magnetic/metal graphic indicia on said at least a portion of said carrier substrate.

50. A metallic security device for use with an item, said metallic security device comprising:

a carrier substrate having a width; and a plurality of conductive regions formed by a metallic layer disposed on said carrier substrate, wherein said conductive regions are separated by non-conductive regions extending across said width of said carrier substrate, said conductive regions having at least two different predetermined lengths forming a predetermined pattern for representing encoded data, and wherein said predetermined pattern may be detected and read to decode said data; and a magnetic layer disposed on and in substantially identical registration with said metallic layer at least in said plurality of conductive regions, for providing magnetic security features, wherein said magnetic layer and said metallic layer in substantially identical registration include recesses, said recesses forming visually identifiable indicia.

51. A method of making a magnetic/metallic security device having a plurality of security features, said method comprising:

providing a carrier substrate having a width and first and second surfaces;

applying a metallic layer to at least a portion of said first surface of said carrier substrate, said applied metallic layer forming a plurality of conductive regions separated by nonconductive regions that extend entirely across said width of said carrier substrate;

applying a magnetic layer over at least a portion of said metallic layer; and etching at least one of said magnetic layer and said metallic layer such that at least a portion of said magnetic layer and said metallic layer are in substantially identical registration and wherein said magnetic layer and said metallic layer in substantially identical registration include recesses, said recesses forming visually identifiable indicia.

52. A method of making a magnetic/metallic security device having a plurality of security features, said method comprising:

providing a carrier substrate having a width and first and second surfaces;

applying a metallic layer to at least a portion of said first surface of said carrier substrate;

applying a magnetic chemical resist to at least a portion of said metallic layer, wherein said magnetic chemical resist forms a pattern on said metallic layer; and chemically etching said metallic layer to remove exposed portions of said metallic layer forming a plurality of conductive regions separated by non-conductive regions that extend entirely across said width of said carrier substrate, wherein chemical etching is resisted by said magnetic chemical resist such that said magnetic chemical resist and at least a portion of said metallic layer underlying said magnetic chemical resist are in substantially identical registration and together form visually identifiable indicia on said carrier substrate, and wherein said magnetic layer and said metallic layer in substantially identical registration include recesses, said recesses forming said visually identifiable indicia.

53. A method of making a magnetic/metallic security device having a plurality of security features, said method comprising:

providing a carrier substrate having *a width and* first and second surfaces;

applying a metallic layer directly to at least a portion of said first surface of said carrier substrate*, wherein said metallic layer forms a plurality of conductive regions on said carrier substrate, wherein said conductive regions are separated by non-conductive regions which extend entirely across said width of said carrier substrate*; and applying a magnetic layer over at least a portion of said metallic layer such that at least a portion of said magnetic layer and said metallic layer are in substantially identical registration and wherein said magnetic layer and said metallic layer in substantially identical registration together form visually identifiable graphic indicia.

54. A magnetic/metallic security device for use with an item to provide multiple security features, said magnetic/metallic security device comprising:

a carrier substrate having a width; and a magnetic/metal security feature comprising:

a magnetic/metal security feature including a metallic layer disposed on at least a portion of said carrier substrate, for providing metallic security features, along with a magnetic layer disposed on and in substantially identical registration with said metallic layer, for providing magnetic security features, *wherein said metallic layer forms a plurality of conductive regions on said carrier substrate, wherein said conductive regions are separated by non-conductive regions which extend entirely across said width of said carrier substrate, and* wherein said magnetic layer and said metallic layer together form visually identifiable magnetic/metal graphic indicia on said at least a portion of said carrier substrate; and/or a magnetic/metal security feature including a metallic layer disposed on at least a portion of said carrier substrate, for providing metallic security features, wherein said metallic layer forms a plurality of conductive regions on said carrier substrate, wherein said conductive regions are separated by non-conductive regions which extend entirely across said width of said carrier substrate, along with a magnetic layer disposed on and in substantially identical registration with at least one of said plurality of conductive regions, for providing magnetic security features, wherein said magnetic layer and said at least one conductive [regions] *region* in substantially identical registration include recesses, said recesses forming visually identifiable indicia.

55. A magnetic/metallic security device for use with an item to provide multiple security features, said magnetic/metallic security device comprising:

a carrier substrate *having a width*;

a metallic layer disposed on at least a portion of said carrier substrate, for providing metallic security features*, wherein said metallic layer forms a plurality of conductive regions on said carrier substrate, wherein said conductive regions are separated by non-conductive regions which extend entirely across said width of said carrier substrate*; and a magnetic layer disposed on and in substantially identical registration with said metallic layer, for providing magnetic security features, wherein said magnetic layer and said metallic layer together form visually identifiable magnetic/metal graphic indicia in the form of discrete, non-connected, graphic indicia on said at least a portion of said carrier substrate.

*56. A magnetic/metallic security device for use with an item to provide multiple security features, said magnetic/metallic security device comprising:*

*a carrier substrate having a width;*

*a metallic layer disposed on at least a portion of said carrier substrate, for providing metallic security features, wherein said metallic layer forms a plurality of conductive regions on said carrier substrate, wherein said conductive regions are separated by non-conductive regions which extend entirely across said width of said carrier substrate; and*

*a magnetic layer disposed on and in substantially identical registration with at least a portion of at least one of said plurality of said conductive regions, for providing magnetic security features, wherein said magnetic layer and said at least a portion of at least one conductive region in substantially identical registration include recesses, said recesses forming visually identifiable indicia.*

*57. The magnetic/metallic security device of claim 56, which further comprises a coating layer disposed over said magnetic layer.*

*58. A magnetic/metallic security device for use with an item to provide multiple security features, said magnetic/metallic security device comprising:*

*a carrier substrate having a width; and*

*a magnetic/metal security feature comprising:*

*a magnetic/metal security feature including a metallic layer disposed on at least a portion of said carrier substrate, for providing metallic security features, along with a magnetic layer disposed on and in substantially identical registration with said metallic layer, for providing magnetic security features, wherein said metallic layer forms a plurality of conductive regions on said carrier substrate, wherein said conductive regions are separated by non-conductive regions which extend entirely across said width of said carrier substrate, and wherein said magnetic layer and said metallic layer together form visually identifiable magnetic/metal graphic indicia on said at least a portion of said carrier substrate; and/or*

*a magnetic/metal security feature including a metallic layer disposed on at least a portion of said carrier substrate, for providing metallic security features, wherein said metallic layer forms a plurality of conductive regions on said carrier substrate, wherein said conductive regions are separated by non-conductive regions which extend entirely across said width of said carrier substrate, along with a magnetic layer disposed on and in substantially identical registration with at least a portion of at least one of said plurality of*

*conductive regions, for providing magnetic security features, wherein said magnetic layer and said at least a portion of at least one conductive region in substantially identical registration include recesses, said recesses forming visually identifiable indicia.*

*59. The magnetic/metallic security device of claim 58, which further comprises a coating layer disposed over said magnetic layer.*

*60. A magnetic/metallic security device for use with an item to provide multiple security features, said magnetic/metallic security device comprising:*

*a carrier substrate having a width;*

*a metallic layer disposed on at least a portion of said carrier substrate, for providing metallic security features, wherein said metallic layer forms a plurality of conductive regions on said carrier substrate, wherein said conductive regions are separated by non-conductive regions which extend entirely across said width of said carrier substrate; and*

*a magnetic layer disposed on and in substantially identical registration with at least a portion of at least one of said plurality of said conductive regions, for providing magnetic security features, wherein recesses forming visually identifiable indicia are formed in at least one of (a) any of said conductive regions and (b) said magnetic layer in substantially identical registration with at least a portion of at least one conductive region.*

*61. The magnetic/metallic security device of claim 60, which further comprises a coating layer disposed over said magnetic layer.*

*62. A magnetic/metallic security device for use with an item to provide multiple security features, said magnetic/metallic security device comprising:*

*a carrier substrate having a width; and*

*a magnetic/metal security feature comprising:*

*a magnetic/metal security feature including a metallic layer disposed on at least a portion of said carrier substrate, for providing metallic security features, along with a magnetic layer disposed on and in substantially identical registration with said metallic layer, for providing magnetic security features, wherein said metallic layer forms a plurality of conductive regions on said carrier substrate, wherein said conductive regions are separated by non-conductive regions which extend entirely across said width of said carrier substrate, and wherein said magnetic layer and said metallic layer together form visually identifiable magnetic/metal graphic indicia on said at least a portion of said carrier substrate; and/or*

*a magnetic/metal security feature including a metallic layer disposed on at least a portion of said carrier substrate, for providing metallic security features, wherein said metallic layer forms a plurality of conductive regions on said carrier substrate, wherein said conductive regions are separated by non-conductive regions which extend entirely across said width of said carrier substrate, along with a magnetic layer disposed on and in substantially identical registration with at least a portion of at least one of said plurality of conductive regions, for providing magnetic security features, wherein recesses forming visually identifiable indicia are formed in at least one of (a) any of said conductive regions and (b) said magnetic layer in substantially identical registration with at least a portion of at least one conductive region.*

*63. The magnetic/metallic security device of claim 62, which further comprises a coating layer disposed over said magnetic layer.*

*64. A magnetic/metallic security device for use with an item to provide multiple security features, said magnetic/metallic security device comprising:*

*a carrier substrate having a width;*

*a metal security feature comprising a metallic layer disposed on at least a portion of said carrier substrate, said metallic layer forming a plurality of conductive regions on said carrier substrate, said conductive regions being separated by non-conductive regions which extend entirely across said width of said carrier substrate, each conductive region of said metallic layer including at least one predetermined characteristic that is detectable such that said metallic layer provides metallic security features, said metallic layer further including visually identifiable graphic indicia; and*

*a magnetic security feature comprising a magnetic layer including at least one type of magnetic substance having at least one predetermined magnetic characteristic such that said magnetic layer provides magnetic security features;*

*wherein said magnetic layer is disposed on at least some of said metallic layer.*

*65. The magnetic/metallic security device of claim 64, which further comprises a coating layer disposed over said magnetic layer.*

* * * * *